Nov. 17, 1970   C. W. EYMAN, JR., ET AL   3,540,227
AUTOMATIC FREEZER
Filed Nov. 12, 1968                                                                 5 Sheets-Sheet 1

INVENTORS.
Charles W. Eyman, Jr.,
Floyd O. Moody, &
Harold M. Snyder
Carl A. Stickel
ATTORNEY INVENTORS.
Charles W. Eyman, Jr.,
BY Floyd O. Moody, &
Harold M. Snyder
Carl A. Stickel
ATTORNEY

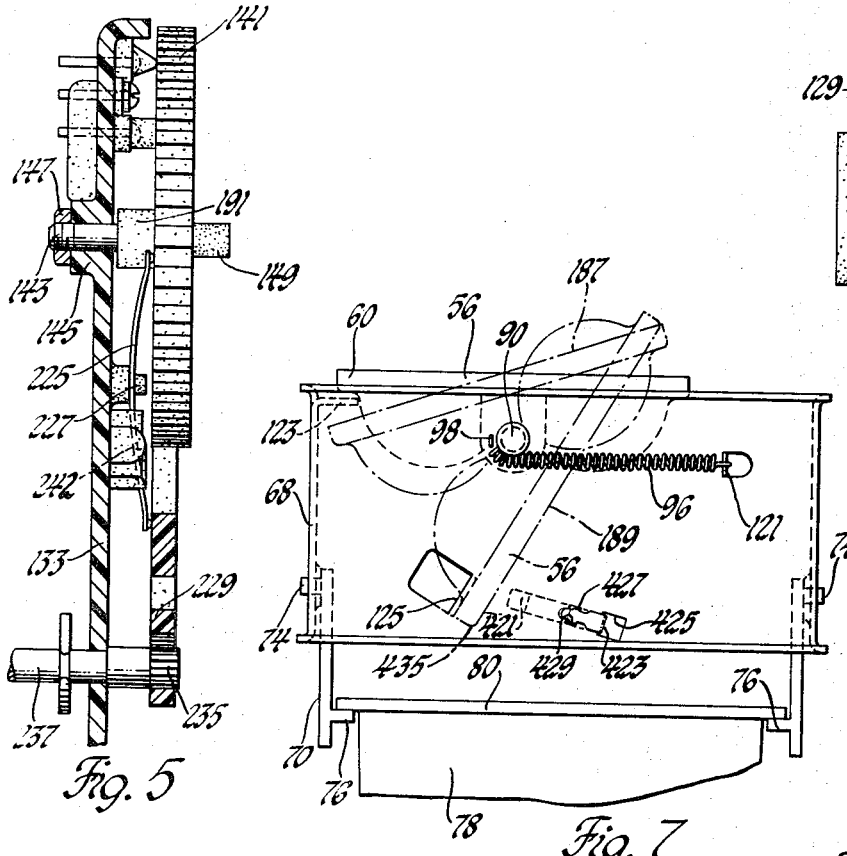

Nov. 17, 1970  C. W. EYMAN, JR., ET AL  3,540,227
AUTOMATIC FREEZER

Filed Nov. 12, 1968  5 Sheets-Sheet 4

INVENTORS.
Charles W. Eyman Jr.,
BY Floyd O. Moody, &
Harold M. Snyder
Carl A. Stickel
ATTORNEY Nov. 17, 1970  C. W. EYMAN, JR., ET AL  3,540,227
AUTOMATIC FREEZER
Filed Nov. 12, 1968  5 Sheets-Sheet 5

INVENTORS.
Charles W. Eyman, Jr.,
BY Floyd O. Moody, &
Harold M. Snyder
Carl A. Stickel
ATTORNEY United States Patent Office 3,540,227
Patented Nov. 17, 1970

3,540,227
AUTOMATIC FREEZER
Charles W. Eyman, Jr., and Floyd O. Moody, Dayton, and Harold M. Snyder, Springfield, Ohio, assignors to General Motors Corporation, Detroit, Mich., a corporation of Delaware
Filed Nov. 12, 1968, Ser. No. 774,786
Int. Cl. F25c 5/18
U.S. Cl. 62—137
6 Claims

ABSTRACT OF THE DISCLOSURE

In the preferred form an electric motor drives a large gear which operates a Scotch yoke type cam having an interrupted rack connected to it for turning an interrupted pinion which is operably connected to one end of a flexible mold for inverting and twisting the mold about the axis of a double throw hydraulic thermostat switch. A commutator is provided on the large gear. Cooperating with this commutator and thermostat are spring contacts controlling the filling, freezing and ejection periods. One of these commutator contacts is pivoted into and out of contact with a wedge shaped contact by the movable bin carrier under the control of a weak and stronger spring arrangement to stop the operation whenever the bin is removed or when it is filled to a measured amount. A manual adjustment moves this wedge shaped contact relative to this pivoted contact to vary the mass of frozen pellets or ice cubes which may be deposited in the bin before the operation is stopped.

---

It is an object of this invention to provide a simple, economical, low cost, durable, trouble-free automatic freezer having a simple hydraulic thermostatic control for detecting the freezing of the liquid and particularly having a simple adjustable bin control arrangement cooperating with one of the contacts of the commutator to stop the operation when the bin is either removed or filled to a selected amount.

Further objects and advantages of the present invention will be apparent from the following description, reference being had to the accompanying drawings, wherein preferred embodiments of the present invention are clearly shown.

In the drawings:

FIG. 5 is an irregular horizontal sectional view taken along the lines 5—5 of FIG. 4;

FIG. 6 is an irregular vertical sectional view taken along the lines 6—6 of FIG. 4;

FIG. 7 is a rear view of the automatic freezer;

FIG. 8 is a fragmentary vertical sectional view taken along the lines 8—8 of FIG. 9;

FIG. 9 is a fragmentary vertical sectional view similar to FIG. 4 but with parts broken away to show the Scotch yoke type cam and drive;

THE REFRIGERATOR

Figure 1:
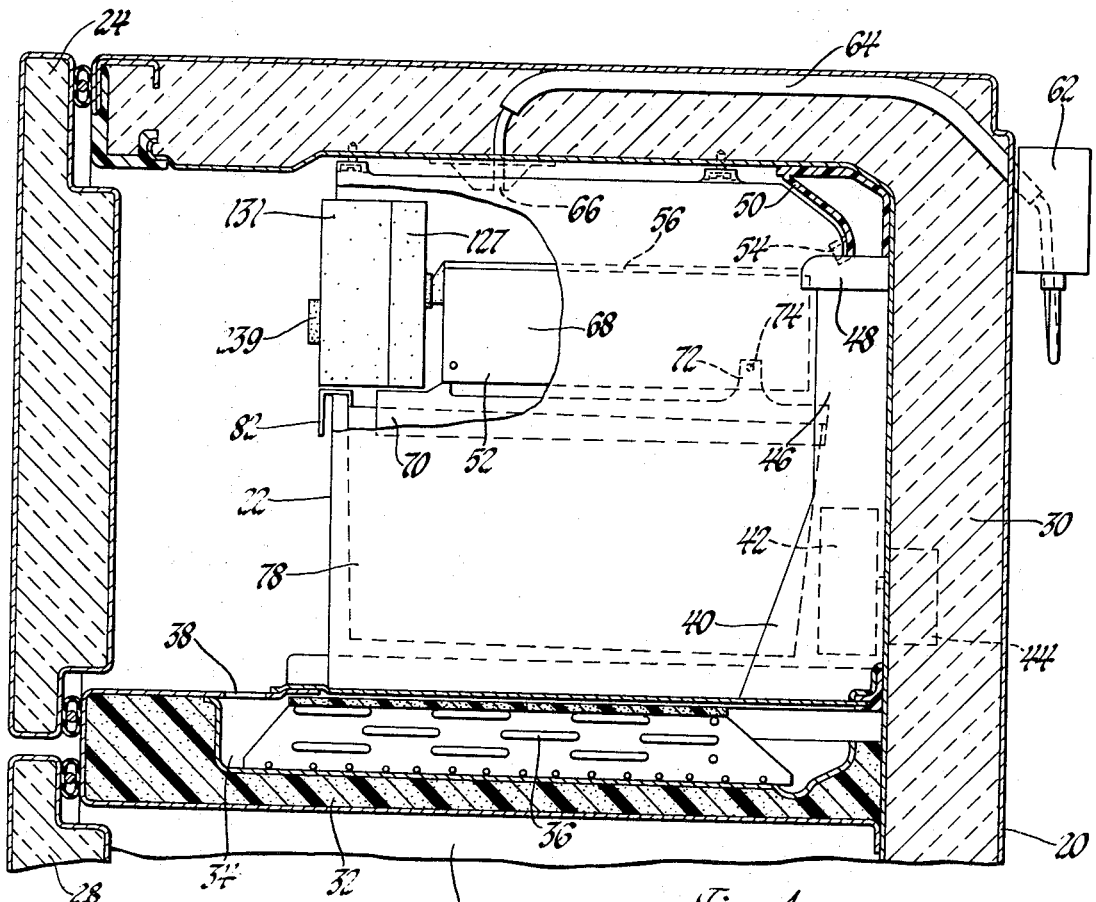
FIG. 1 is an irregular vertical sectional view through a refrigerator embodying an air cooled automatic freezer illustrating one form of our invention.
Figure 2:
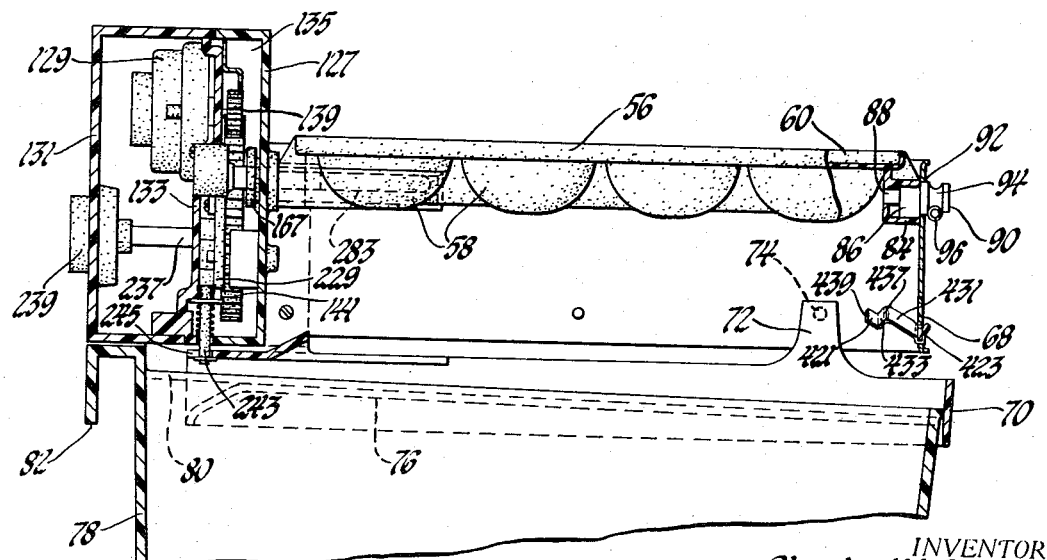
FIG. 2 is a vertical sectional view through the automatic freezer shown in FIG. 1.

Referring now to the drawings and more particularly to FIG. 1, there is shown a frost free type of household refrigerator 20 with an upper below freezing compartment 22 closed by an insulated door 24 and a lower above freezing compartment 26 closed by a lower insulated door 28. These compartments are surrounded by the insulated side, top, bottom and rear walls 30 and separated by a horizontal insulated wall 32 containing an evaporator compartment 34 provided with a finned evaporator 36 having vertical fins extending from the front to the rear of the compartment 34. The evaporator compartment 34 is provided with an inlet 38 at the front communicating with the front of the below freezing compartment 22 and additional inlets (not shown) communicating with the top of the below freezing compartment 26. At the rear, the compartment 34 connects with a shroud 40 communicating with the entrance to a centrifugal fan 42 which is driven by an electric motor 44 housed in the rear wall 30 of the cabinet. The cooling arrangement for the compartments may be similar to that shown in Pats. 3,359,750 issued Dec. 26, 1967 or 3,310,957 issued Mar. 28, 1967, which may be referred to for further details of construction of the refrigerator.

The fan 42 is provided with an upwardly extending discharge duct 46 having a distributor 48 at the top which distributes the discharge of air through the below freezing compartment 22. The evaporator 36 is maintained at suitable below freezing temperatures such as —5 to —15° F. to maintain the compartment 22 at the temperature of 0° F. or below.

COOLING OF THE FREEZER

For providing special cooling for the automatic freezer, the distributor 48 is provided with a laterally extending discharge duct 50 extending along the intersection of the rear and top walls. Behind the liquid freezer 52 the laterally extending duct 50 is provided with wide discharge nozzles 54 which discharge the cold air directly onto the top of the liquid freezer 52 and particularly onto the top of the mold 56.

THE MOLD AND WATER SUPPLY

The mold 56 is provided with two rows of pockets 58 containing four pockets in each row and has an upwardly flanged rim 60 extending around the short and long sides thereof. The mold 56 of the liquid freezer is supplied with water or any other liquid to be frozen from a pressure water system or other liquid under pressure to a solenoid control valve 62 which controls the flow of water through a pipe 64 extending through the insulation of the top wall to a suitable discharge device 66 in the top wall of the below freezing compartment 22 above the front pockets 58 of the mold 56. The freezer 52 is provided with a wide U-shaped frame 68 which surrounds the mold 56 and is fastened to the adjacent side wall of the freezing compartment 22 by suitable screws. Below the frame 68 is a rectangular bin carrier 70 having, adjacent the rear, upwardly extending pivoting projections 72 which are pivoted on the pivot pins 74 to the side walls of the frame 68. The bin carrier 70 is provided with supporting ledges 76 on its inner sides for supporting the laterally extending flanges 80 of the box shaped bin 78. The bin 78 is provided with a double flange 82 at the front to serve as a handle.

At the rear, the mold 56 has an integrally molded boss 84 provided with a recess tightly receiving the flattened cylindrical portion 86 and a coaxial projecting pin 88 of the pivot pin 90 having a bearing portion 92 of reduced size fitting a bearing aperture within the rear wall of the frame 68. This pivot pin 90 outside the frame 68 also has an annular groove 94 around which is wrapped a portion of a tension type coil spring 96 which has one end hooked to a hook 98 projecting from the groove 94 of the pivot pin 90. This spring 96 has its opposite end hooked to the punched out tab 121 on the rear wall of the frame 68. The frame 68 also has a stop 123 which is punched out of its side wall for extending into the path of movement of the adjacent portion of the rim 60 of the mold 56 to stop in the horizontal position the rotation of the rear of the mold in the direction of the turning force applied by the tension spring 96. The rear wall of the frame 68 provides a second projection 125 which extends into the path of movement of the rim 60 in the direction opposite the pull of the spring 96 to limit to 122½° the inverting movement of the rear of the mold 56.

To further insure the complete ejection of all the frozen liquid from the mold 56 during the second twist thereof, there is provided a spring detent 421 which comprises a leaf spring having a U-shaped hook 423 at one end which hooks through the aperture 425 in the end wall of the frame 68 and which has a pair of barbs 427 extending into a second aperture 429 in the frame which align and hold in place the spring detent 421. The spring detent includes a main portion 431 extending at an angle of about 30° toward the tray which terminates in a Z-shaped end portion 433. The mold 56 is provided with a sharp corner portion 435 having a reinforcing bead beneath upturned rim 60 which is adapted to engage a rounded notch 437 in the Z-shaped end portion and to be held there about 15° in advance of the stop 125. The continued turning of the front end of the mold 56 imparts a twist and this twisting continues until a twist of about 17° is imparted to the mold. The twisting is resisted by the spring detent arrangement 421. The rear corner 435 of the mold increases its pressure on the notch 437 gradually forcing the main portion 431 inwardly until the rear corner 435 suddenly rides completely out of the notch 437 and under the resilient force provided by the 17° twist in the mold accelerates into engagement with the stop 125. This imparts a jar and the resulting vibration forces eject the frozen liquid from the mold into the bin 78. The rotation of the front of the mold continues about 17½° after the corner of the mold engages the stop 125 to impart a third twist to the mold 56 to further insure complete ejection. The extension 439 forming the extreme end of the Z-shape is sufficiently long to be engaged by the corner 435 of the mold during the period following the release from the notch 437 so as to prevent the latching from taking place on the return of the mold to the horizontal position.

THE EJECTION SYSTEM

For accessibility, all the mechanism and the controls are located at the front of the freezer with the tray rotating and twisting mechanism and the control system being located in the rear housing 127 while the electric driving motor 126 and the wiring are located in the front housing 131. Both of these housings are formed of suitable plastic. Substantially the entire operating and control mechanism are mounted upon an irregular plastic upright dividing wall 133 which divides the interior of the housings 127 and 131 into a rear compartment 135 and a front compartment 137. The front compartment contains the drive motor 129 having its final drive shaft extending through the dividing wall 133 and provided with a drive pinion 139 on the opposite side which continuously meshes with the large driven gear 141. This large gear 141 has a hub 191 into which is press fitted a bearing pin 143 which extends through a bearing 145 in the wall 133 and is provided with a nut 147 or some other type retainer on the opposite side.

On the opposite side, the large gear 141 is provided with an eccentrically located integral crank pin 149 which extends through the upright yoke 151 molded integrally with the horizontal rack bar 153. The yoke 151 is in the form of an elongated irregular loop in which the sides are in the form of cams which cooperate with the crank pin 149 to reciprocate the rack bar 153 in a manner similar to a Scotch yoke mechanism. The difference from a true Scotch yoke mechanism is that the surfaces of the yoke contacted by the crank pin 149 are not all perpendicular to the rack bar 153 and in particular the yoke includes a curved cam surface 155 on the side opposite the bar 153 and a curved and inclined surface 157 on the side adjacent the bar 153. The rack bar includes seven full teeth 159 adjacent to the yoke 151. Between the seven full teeth 159 and the yoke there is a single half tooth which is cut off substantially at the pitch line. To the right of the seven teeth 159 is a flat area 161 substantially equal to the length of the seven teeth which is located in the plane of the pitch line of the seven teeth 159 which assures that the mold is held horizontally during the fill period. To the right of the flat area 161 is a single tooth 163. Between this single tooth and the flat surface 161 is a single root or dedendum.

The rack bar 153 is slidably mounted in a horizontal groove 165 provided in the adjacent wall of the rear housing 127. The rack bar 153 and its teeth 159 and 163 cooperate with an interrupted pinion 167 which is provided on the front end of a coaxial sleeve 169 which is rotatably mounted in the bearing 171 provided in the rear cover 127. This sleeve has a coaxial rearward hollow projection 173 provided with a flattened upper surface which fits tightly within a boss 175 located between the front pockets 58 of the mold 56 and containing a recess receiving the projection 173. The rack bar 153 is held in engagement with the pinion 167 by an adjustable eccentric 177 contacting its bottom surface which may be rotated to maintain the teeth 159 and 163 together with the flat area 161 in the proper meshing and contacting relationship with the teeth 179 and 181 and the interrupted surface 183 upon the pinion 167. The eccentric 177 is mounted upon and fastened in place by the screw 185 threading into the rear housing 127.

The crank pin 159 cooperates with the cam surface 155 to apply at the left end of its stroke through the rack bar 153 and the teeth 163 and 181 a maximum torque for applying an initial reverse twist of 17½° to the front end of the mold as indicated by the dot dash lines 187 in FIG. 7. The crank pin 149 and the yoke 151 cooperate after the initial twist of the harvesting cycle to first move the flat area 161 relative to the interrupted tooth section 183 of the pinion 167 until the teeth 159 engage the teeth 179 to rotate and invert the mold 56 until after 140° the rear of the mold 56 engages the stop 125 as indicated by the dot and dash line position indicated by the reference character 189 in FIG. 7. This rotation continues to finally twist the mold until it completes a 17½° twist opposite to the initial twist. The maximum torque for this twisting is obtained at the right end of the stroke by the engagement of the crank pin 149 with the cam surface 157. The cooperation between the interrupted tooth portion 183 and the flat surface 161 during the other parts of the movement of the yoke 151 and the rack bar 153 prevent the movement of the mold 56 during the filling period and the interval between the filling period and the time during which the control system becomes set for stopping all operation during the freezing period.

THE CONTROL SYSTEM

The hub 191 of the molded plastic gear 141 is provided with three unsymetrically located axially parallel grooves which are used to lock to it in proper orientation a commutator 193 having three projections properly spaced to fit the grooves in the hub 191 in only one orientation. The gear 141 is recessed to receive and hold in position the thin brass nickel plated commutator 193 which, if desired, may be bonded to the face of the gear 141 nearest the wall 133. The commutator 193 includes a fill projection or segment 195 cooperating with a spring contact and terminal member 197 to measure the fill period by the time required for the fill projection or segment 195 to move past the upper end of the spring contact 197. The commutator 193 also includes a delay projection or segment 199 which cooperates with the angular spring contact 221 having a ball type contact end which normally engages the segments 199 and 195 and the commutator 193 and during the remainder of the time contacts the plastic surface of the gear 141.

As one feature of our invention, the commutator also has an arcuate shaped open portion 223 which cooperates with the adjacent end of a long pivoted contact member 225 which is pivoted on the pin 227 and has a diametrically opposite arm engaging a segment contact member 229 pivoted upon a pivot pin 231. The arcuate open portion 223 is laid out on a radius struck beneath the hub 191 by the end of the contact member 225 as it pivots on its pin 227. When this end engages this open portion 223, no current can flow through the contact member 225 to the commutator 193 to stop operation of the motor 129 after the fill period until another circuit is completed.

THE BIN CONTROL

The segment contact member 229 includes a wedge shaped contact 233 adapted to be contacted by the adjacent end of the pivoted switch contact member 225 when the contact member 225 is adjacent its horizontal position and to be out of contact with the contact 233 whenever it is pivoted a substantial distance either up or down away from the horizontal position. The segment contact member 229 may be pivoted about its pivot pin 231 through a limited distance by having its internal gear segment 236 engaged by a small pinion 235 connected to a shaft 237 having a bearing within an aperture in the wall 133 and extending through the front housing member 131 to a knob 239 located in a recess 241 in the front wall of the housing 131.

Figure 16:
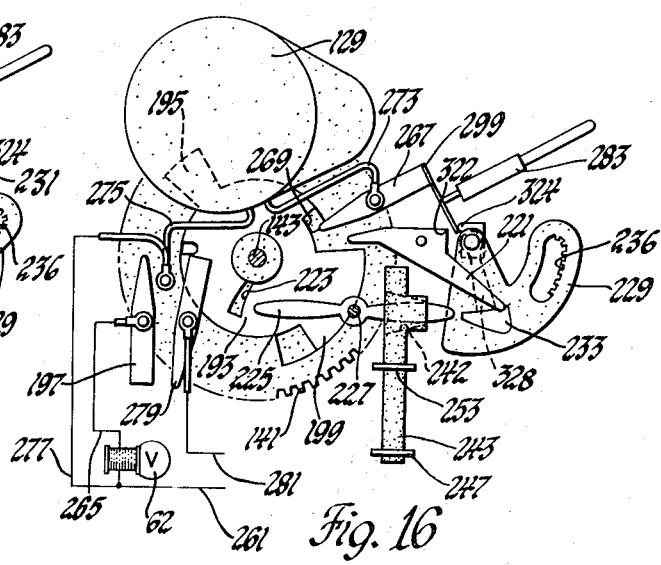
FIG. 16 is a view similar to FIGS. 13 to 15 with the commutator control system in the shutoff and reset position.

The knob 239 has a nonrotatable single orientation connecting arrangement with the shaft 237. This shaft rotates the pinion 235 in engagement with the internal gear segment 236 arranged in an arc about the pivot pin 231 which adjusts the position of the wedge shaped contact 229 so that the adjacent end of the pivoted contact 225 will make contact with either the wide or narrow parts thereof or make no contact at all as illustrated in FIG. 16. The upper edge of the wedge shaped contact 233 is in the form of an arc about the center of the pivot pin 231 for the segment contact member 229 while the lower edge is substantially inclined relative to the upper edge to form the wedge shape. The end of the pivoted contact member 225 adjacent the wedge shaped contact 233 extends through a V-shaped notch 242 in a holder provided at the top of the weigh switch rod 243 which is vertically slidably mounted through the aperture 249 in the bottom of the upright dividing wall 133 and projects through the bottom thereof and through a slot 245 in the front cross member of the bin carrier 70. The bottom of this rod 243 is provided with a C-shaped disc retainer 247 which is keyed thereto and which supports the front cross member of the bin carrier 70.

Resting upon the projection of the upright dividing wall 133 surrounding the aperture 249 and surrounding the weigh shaft 243 is a small coil spring 251 which is sufficiently strong to support the bin 78 until it is substantially filled to the desired amount with ice cubes or frozen liquid. The top of this spring 251 presses against a disc 253 surrounding the weigh rod 243 which is normally held against the shoulder 255 upon the wall 133 by the spring 251. The spring 251 is limited in its expansion by being confined between the wall surrounding the aperture 249 and the shoulder 255. Above this disc 253 is a still smaller and weaker coil spring 257 which surrounds the weigh rod 243 between the disc 253 and a shoulder 259 upon the shaft 243 below the V-notch 242. This light spring 257 is of such a spring force as to be able to support and lift the carrier 70 when the disc 253 is against the shoulder 255 but is not able to support the carrier and the bin 78.

The pivoted contact 225, its pivot 227 and the wedge shaped contact 233 are so coordinated with the springs 251 and 257 which are in additive relationship together with the positions of the lower aperture 249 of the partition wall 133 and the shoulders 255 and 259 so that whenever the bin 78 is removed from the carrier 70, the spring 257 will raise the weigh rod 243 and the adjacent right end of the pivoted contact 225 to lift the contact portion at the right end of the pivoted contact 225 above the arc shaped upper edge of the wedge shaped contact 233 to open this circuit. The pivoted contact 225 is bowed as shown in FIG. 5 so that only the ball points of its opposite ends make contact with the commutator 193 and the wedge shaped contact 233. When the bin 78 is placed in proper position on the carrier 70 the spring 257 will be pressed down until the spring contact 225 is in a horizontal position in engagement with the upper edge portion of the wedge shaped contact 233 and the commutator 193. As the bin receives ice cubes or frozen liquid the weigh rod 243 and its shoulder 259 will move downwardly and push down upon the collapsed container spring 257 which will push downwardly on the disc 253 and the spring 251. The spring 251 will be compressed as the weigh rod 243 and the carrier 70 move downwardly with the increasing weight of the ice cubes or frozen liquid. The V-notch 242 will carry downwardly the adjacent end of the pivoted spring contact 225 which will cause the contact at the adjacent end thereof to ride downwardly across the wedge shaped contact 233. The depth of the wedge shaped contact 233 at any of its points of adjustment relative to the adjacent end of the contact 225 will determine the maximum loading of the bin 78 before the pivoted spring contact 225 is separated from the wedge shaped contact 233 to open the circuit. When the portion of contact 233 having the greatest depth is in contact with the adjacent end of the spring contact, the freezer will operate until there is a maximum load in the bin 78. Preferably, the V-shaped notch 241 is slightly wider than the pivoted spring contact 225 so as to provide a slight lost motion contact therebetween so that the removal of only one or two ice cubes will not cause the reclosing of the contacts 225 and 233 to restart the operation of the freezer.

OPERATION

Figure 13:
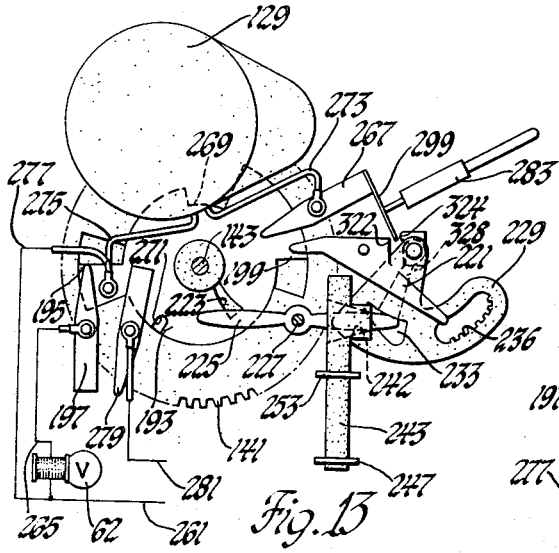
FIG. 13 is a diagrammatic view somewhat similar to FIG. 4 showing the commutator control system at the beginning of the fill period.

The control system is more easily understood from the diagrams thereof illustrated in FIGS. 13–17. FIG. 13 shows the fill spring contact 197 in contact with the upper edge of the fill projection 195 thereby completing a circuit from the supply conductor 261 through the solenoid operated fill valve 62 and the conductor 265 through the contact 197 to the segment 195 of the commutator 193 through which current will flow to the common forked leaf spring contact 279 connecting with the second supply conductors 281. In this position of the commutator 193, the drive motor 129 is also connected in parallel with the fill valve 62 through the conductor 277 which extends from the supply conductor 261 to the conductor 275 which connects to the drive motor having a second conductor 273 connecting with the spring type holding switch contact 267 having a rounded nose in contact with the commutator 193. This energization continues as the large gear 141 and the commutator 193 are rotated clockwise at a rate which is timed by the constant speed of the synchronous drive motor 129. This provides a timed period of engagement of the contact 197 with the commutator fill projection 195 which moves upwardly at a constant speed until the projection 195 moves away from the rounded end of the contact 197 to deenergize the solenoid fill valve 62. During this energization of the fill valve 62, water flows through it from the supply source through the pipe 64 and out of the discharge device 66 into the mold 56.

Figure 14:
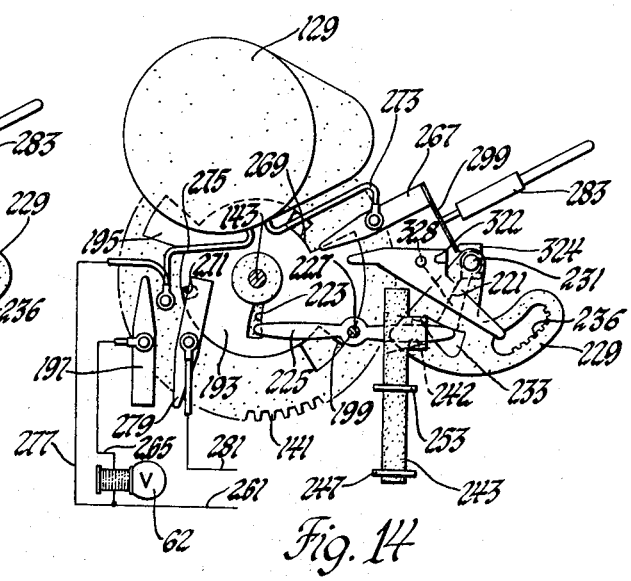
FIG. 14 is a diagrammatic view similar to FIG. 13 with the commutator control system shown during the delay after the completion of the fill period.
Figure 15:
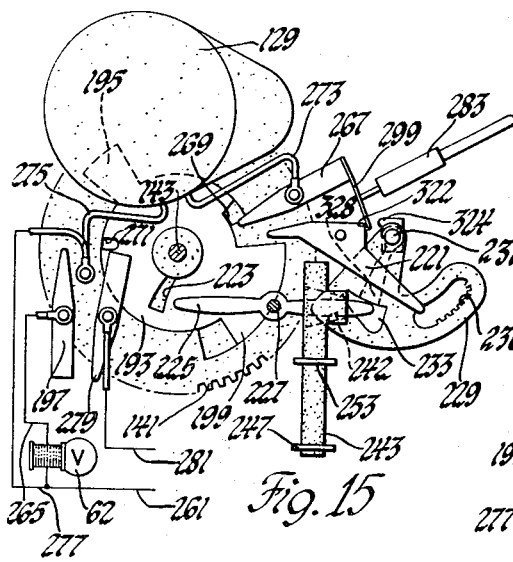
FIG. 15 is a view similar to FIGS. 13 and 14 with the commutator control system shown during the stopping of the operation in the freezing period.

The drive motor 129, however, continues its operation through the contact of the rounded end of the spring holding contact 267 in engagement with the commutator 193. This spring holding contact 267 engages the commutator 193 at all times excepting when the notch 269 or the notch 271 are oriented with its rounded end as illustrated, for example, in FIGS. 15 and 16. The clockwise rotation of the large gear 141 and the commutator 193 continues until the delay projection or segment 199 passes beneath the holding spring contact 267 as shown in FIG. 14 and the notch 269 begins to pass beneath the contact 267. Further clockwise movement of the drive gear 141 and the commutator 193 is under the control of the double throw hydraulic thermostat switch 283.

THE HYDRAULIC SWITCH

Figure 12:
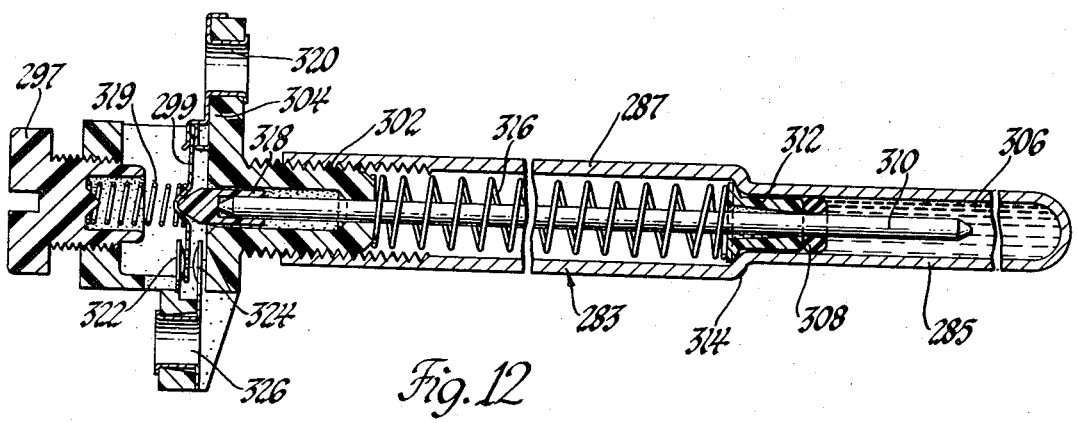
FIG. 12 is an enlarged sectional view taken along the axis of the hydraulic thermostat shown in FIG. 3.

The hydraulic thermostat switch 283 is shown in enlarged cross section in FIG. 12. This hydraulic thermostat switch has a small diameter closed projecting end portion 285 which is a part of the aluminum hydraulic tube 287 which is provided with an adjustable threaded connection 302 with a holder 304. The small end portion 285 contains a silicone mechanical fluid 306 having a high coefficient of expansion. This is retained by an O-ring seal 308 of fluorosilicone rubber which seats the space between the inner walls of the portion 285 and the actuating rod 310 which fills the opening in the seal 308. This seal is normally held in place by a coaxial seal and spring retainer 312 having a shoulder normally resting on the shoulder 314 between the large and small diameter portions of the tube 287. A spring 316 extending between the threaded portion of the holder 304 and the seal and spring retainer 312 normally holds the seal and spring retainer 312 against the shoulder 314 and thereby normally holds the O-ring seal 308 in the position shown. The actuating rod 310 is provided with a follower 318 contacting a recess in the movable double throw switch contact 299 which is normally held in engagement with it by a weak return spring 319 which is adjusted by a screw 297. The expansion and contraction of the silicone fluid 306 slowly moves the movable contact 299 into contact alternately with the warm contact 322 and the cold contact 324.

Figure 3:
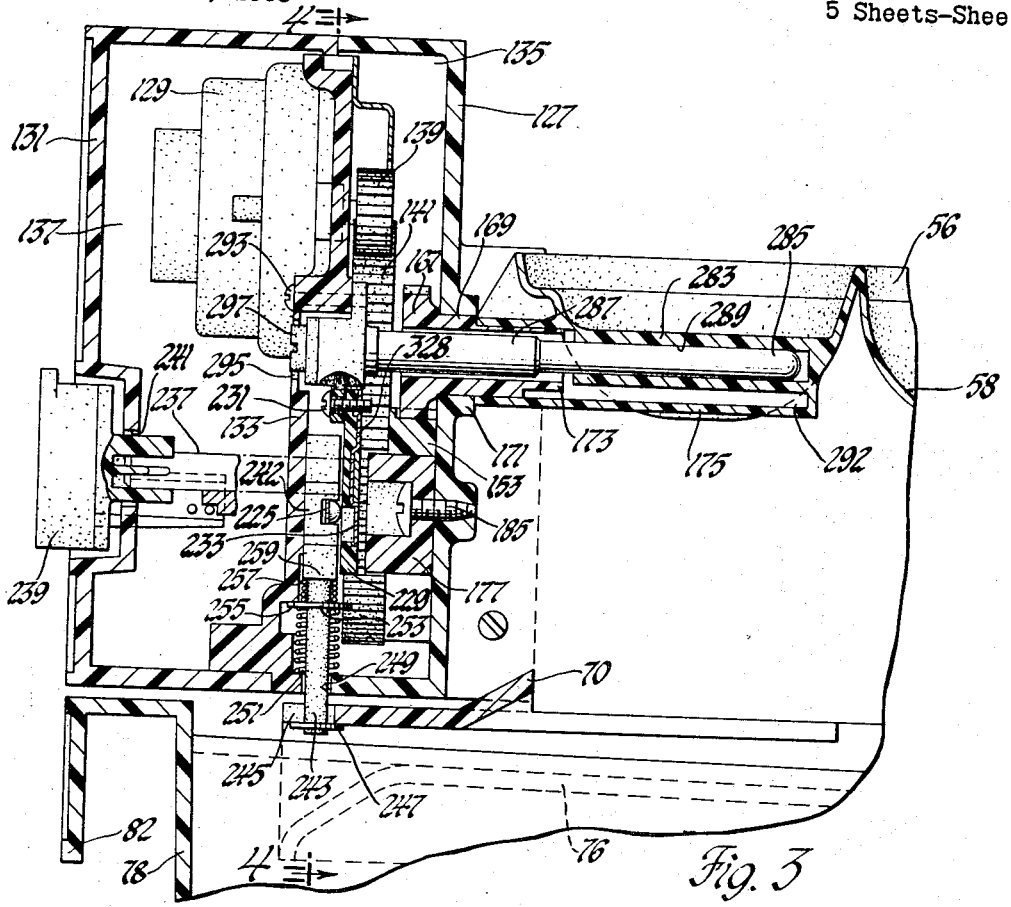
FIG. 3 is an enlarged vertical sectional view taken along the lines 3—3 of FIG. 4 showing the drive and control mechanism.
Figure 4:
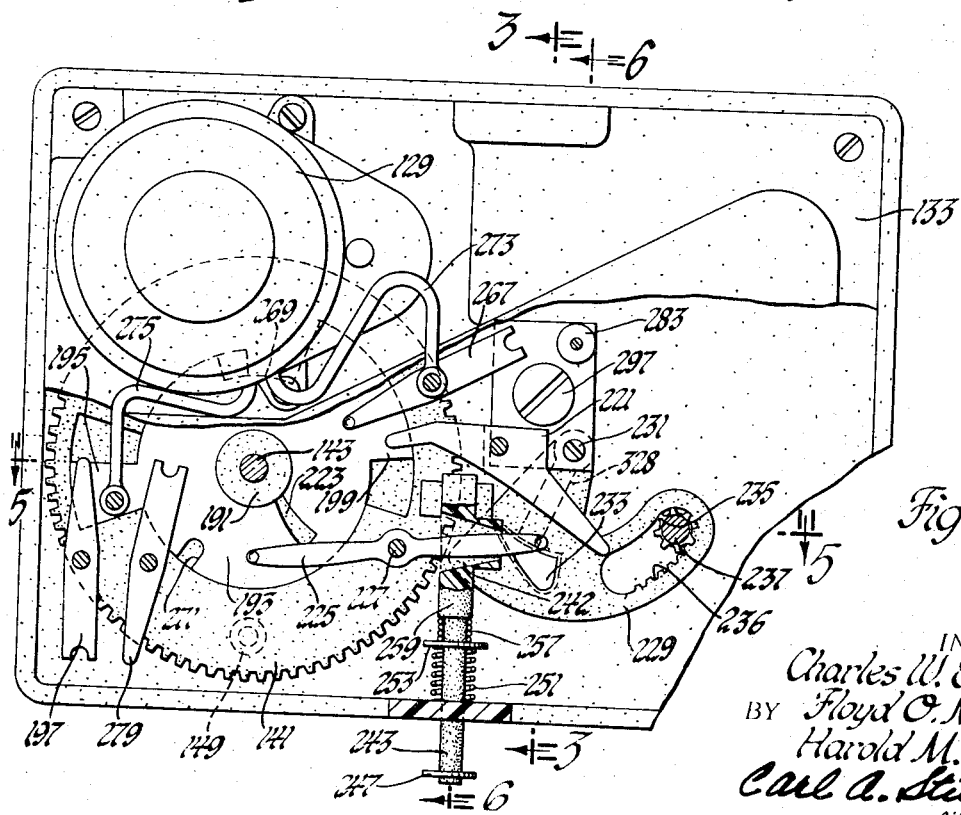
FIG. 4 is a sectional view taken along the lines 4—4 of FIG. 3.
Figure 10:
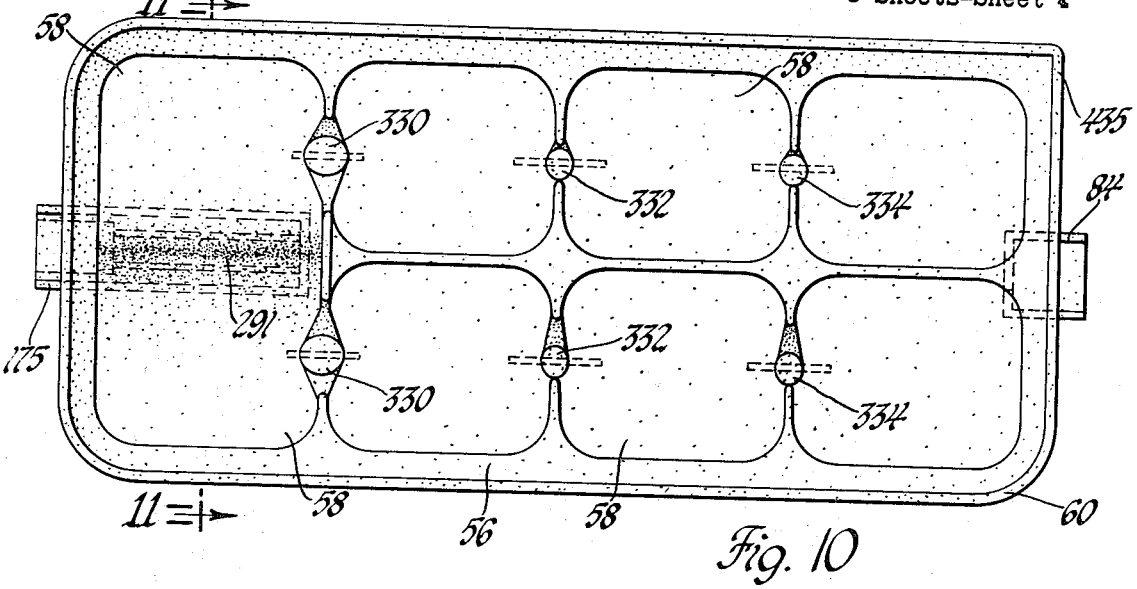
FIG. 10 is a top view of the mold.
Figure 11:
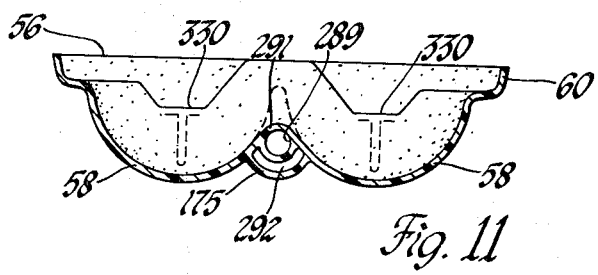
FIG. 11 is a transverse vertical sectional view of the mold taken along the lines 11—11 of FIG. 10.

The small diameter projecting end portion 285 of the hydraulic tube 287 of the hydraulic thermostat switch 283 fits into a coaxial cavity 289 in the boss 175 of the mold 56 between the two front pockets 58 which have a relatively low dividing wall 291 between them. This projecting end portion 285 is shielded from the cold circulating air by the air space 292 provided in the boss 175 surrounding the recess 289 between the adjacent walls of the pockets 58. Through this arrangement the projecting end portion 285 is made predominantly responsive to the temperature of the unfrozen or frozen liquid in the front pockets 58 of the mold 56. The hydraulic tube 287 extends coaxially through the integral sleeve 169 and interrupted pinion 167 as shown in FIG. 3 so that it is not affected by and does not interfere with the rotation of this pinion and the mold 56. The hydraulic thermostat switch is mounted on the upright dividing wall 133 by the terminal screw 293. The dividing wall 133 also includes an aperture 295 through which projects the return spring adjusting screw 297.

The movable contact 299 of the hydraulic switch 283 is connected by the terminal 320 with the adjacent end portion of the holding spring contact 267. The movable switch contact 299 is adapted to engage the stationary contact 322 when the hydraulic thermostat is heated to a temperature of about 15½° F. This contact is integral with a terminal to which the angular contact 221 connects. When the hydraulic thermostat switch 283 is cooled to about 12° F. the movable contact 299 is moved into engagement with the cold contact 324 which is formed integrally with a terminal 326 which is coaxial with and electrically connected to the pivot pin 231 of the segment contact member 229. The pivot pin 231 is in electrical contact with an arm 328 of the wedge shaped contact 233. Thus, by this arrangement the switch contact 267 can be connected through the movable switch contact 299 with either the angular spring contact 221 or through the wedge shaped contact 233 to the pivoted spring contact 225. This provides two alternate paths of conduction between the contact 267 and the commutator 193.

THE FILL CONTROL

The energization of the fill solenoid valve 62 during the period the synchronous drive motor 129 moves the fill projection 195 in wiping contact with the fill spring contact 197 times the water or other liquid flow from the valve 62 through the tube 64 and the discharge device 66 into the front pockets 58 of the mold 56 from which the liquid will distribute through the weirs 330, 332 and 334 into the remainder of the pockets 58.

THE DELAY SYSTEM

This water or liquid will be at above freezing temperatures and will warm the hydraulic thermostat switch 283 to cause the movable contact 299 to engage the warm contact 322 thereby establishing the alternative circuit through the angular contact 221, the projection 199 of the commutator 193 and the common contact 279 to the second supply conductor 281. This energization continues the operation of the drive motor 129 and the rotation of the drive gear 141 and the commutator 193 when the notch 269 passes beneath the holding contact 267. Should the switch contact 299 remain in contact with the cold contact 324 for any reason whatsoever, such as excessive cooling by the cold air in the freezing compartment or ice remaining adjacent the hydraulic thermostat switch 283, operation may continue through the switch members 299, 324, the conductor strip 328, the wedge shaped contact 233 and the pivoted spring contact 225 until the arcuate slot 223 passes under the round nose contact at the adjacent end of the pivoted spring contact 225. According to our invention, this slot 223 assures an important first delay in the operation. The purpose of this first delay is to prevent continuous operation directly to the ejection cycle without any freezing time which would dump water into the bin 78. This first delay provided by the slot 223 thereby prevents this lack of freezing time from occurring by preventing continuance of the operation as long as the current supply for the drive motor 129 depends upon current flow from the movable switch contact 299 to the cold contact 324. This, therefore, assures that ejection will not take place until after the switch contact 229 has moved into engagement with the warm contact 322.

After the switch contact 299 is moved to engage the warm contact 322 by the foregoing events, the operation moves the slot 223 away from the adjacent end of the pivoted contact 225 and continues until the notch 269 passes beneath the round nose contact of the angular switch contact 221 to shut off all current to the drive motor 129. This second delay provides an idle time for all of the mechanism during which the cold air circulated within the freezing compartment progressively freezes the liquid or water in the mold 56 particularly from the rear to the front so that the liquid in the front pockets 58 is frozen last. During this freezing period the switch contact 299 is moved slowly out of contact with the warm contact 322 and into engagement with the cold contact 324. Normally, the motor 129 will not restart until the hydraulic thermostat switch 283 is cooled to a temperature of about 12° F. after the liquid in the mold 56 is completely frozen.

THE EJECTION CONTROL

Figure 17:
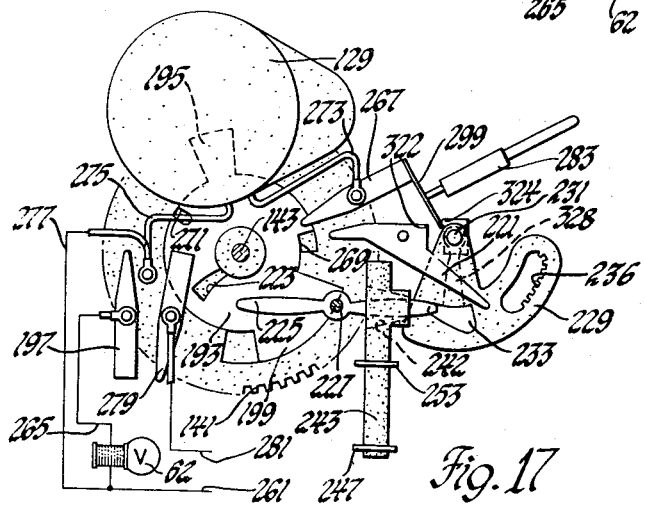
FIG. 17 is a view similar to FIGS. 13 to 16 with the commutator control system shown in the harvesting position.

As shown in FIG. 17, this completes a circuit from the drive motor 129 through the conductor 273, the holding contact 267, the switch member 299, the cold contact 324, the pivot pin 231, the strip conductor 328, the wedge shaped contact 233, the pivoted spring contact 225, the commutator 193, the forked contact 279 to the supply conductor 281. This restarts the drive motor 129 causing the moving of the integral crank pin 149 against the outer side of the yoke 151 and in contact with the curved surface 155 to apply with an increasing mechanical advantage and torque through the teeth 163 and 181 an initial clockwise twist to the front end of the mold 56 until the twisting reaches 17½° while the rear end of the mold 56 is held against the stop 123. The crank pin 149 by engaging the surface 157 then begins to move the rack bar 153 and the yoke 151 to the right with the flat portion 161 in engagement with the flat portion 183 of the pinion 167 until the rack teeth 159 engage the pinion teeth 179 to turn the mold 56 in the counterclockwise direction until the rear corner 435 of the mold engages the spring detent arrangement 421. The front end of the mold continues to be turned after this engagement and after about 17° of twist, the spring detent arrangement 421 will release the corner 435 of the mold and cause it to strike the stop 125 to impart a jar and vibration to the mold to free the frozen liquid therefrom. After this release the turning of the front end of the mold continues without interruption with the rear corner of the mold in engagement with the stop 125 to again twist the mold. The crank pin 149 however, continues to move the rack 153 and the pinion 167 17½° further after the stop 125 has been engaged to apply to the mold 56 a counterclockwise twist of 17½° in the opposite direction from the initial clockwise twist to assure the complete discharge of all the frozen liquid from the mold directly into the bin 78. The operation of the drive motor continues and the operation of the crank pin 149 in the yoke 151 returns the mold to its normal upright position until the flat portion 161 is again in engagement with the flat portion 183 of the pinion 167. When this position is reached the horizontal position of the rear of the mold 56 is assured by the tension coil spring 96 which resiliently holds the rear of the mold 56 against the stop 123. The horizontal position of the front of the mold 56 is assured by the engagement of the flat portions 161 and 183. The freezer is then ready to begin another complete cycle beginning with the refilling of the mold 56.

THE BIN SHUT OFF

When sufficient ice cubes or frozen liquid have collected in the bin 78 the carrier 70 and the rod 243 will be pulled downwardly to pull downwardly the adjacent end of the pivoted spring contact 225 below the wedge shaped contact 233. This will not immediately stop the operation but will assure the stopping of the operation when the notch 271 passes beneath the holding contact 267. This will allow the cycle to proceed through the filling period and the freezing period but will stop the operation before any part of the ejection. One purpose of this is to prevent the stopping of the operation at some time during which the mold is being twisted. Furthermore, it makes possible the storage of a mold full of frozen liquid when the bin is full.

The operation of the freezer is also stopped when the bin 78 is withdrawn. This is accomplished by the light coil spring 257 which is supported by the disc 253 and has sufficient force to lift the empty carrier 70, the rod 243, the V-notch 241 and the pivoted contact 225 above the upper edge of the wedge shaped contact 233 to stop the operation in a similar manner to that previously described when the bin 78 is filled.

The quantity of frozen liquid or ice cubes required in the bin 78 before automatically stopping the operation is adjusted by the knob 239 which turns the pinion 235 so as to pivot the segment contact member 229 and the wedge shaped contact 233 about the pivot pin 231. In the extreme counterclockwise position of the contact member 229 illustrated in FIG. 16 the wedge shaped contact is moved to the right beyond the adjacent end of the pivoted contact 225 to stop the operation of the freezer in a manner similar to that which takes place when the bin 78 is either filled or withdrawn. If any condition occurs which prevents the movable contact 299 from moving into engagement with the warm contact 322 during the first delay provided by the slot 223, there is no normal way for operation of the freezer to continue. To make possible the resumption of operation of the freezer, when the knob 239 is rotated to its extreme counterclockwise off reset position, the segment contact member 229 is pivoted to the position shown in FIG. 16 thereby closing a shunt circuit which shunts the pivoted contact member 225 when it is registered with the slot 223. This shunt circuit is closed by the engagement of the left and right ends of the spring contact member 221 with the segment 199 of the commutator 193 and with the wedge shaped contact 233 which is connected electrically through the arm 328, the cold switch contact 324, the movable switch contact 299, the contact member 267 and the conductor 273 with the synchronous drive motor 129. This shunt circuit thereby provides a method of restarting the drive motor 129 so as to move the slot 223 of the commutator in a clockwise direction away from the left end of the pivoted contact member 225 to resume operation of the freezer.

To reduce the time during which it might be possible to eject the cubes from the mold when the bin 78 is removed, we provide an additional notch 271 in the peripheral portion of the commutator 193. This notch 271 passes beneath the adjacent end of the spring contact 267 immediately after the initial twist. The purpose of this notch is to stop freezer operation at a desirable time such as after the initial twist so that the operation of the bin control system will not stop the operation during a period in which the mold is under a twist. The notch 271 is located so that any stopping caused by the withdrawal of the bin 78 or the complete filling of the bin 78 will occur after the initial twist. This is expected to prevent any permanent set taking place in the shape of the mold. This notch 271 provides a stopping period in addition to the normal stopping period prior to the initial twist provided by the recess 269 in the commutator 193 for assuring the freezing period.

This control system is very reliable and can be made from relatively inexpensive components. The cost is made lower by reason of the dual use and functions of many of the parts such as the combining of the drive gear with the commutator and the multiple use of the pivoted contact 225, the angle contact 221 and the wedge shaped contact 233. The integration of the terminals of the hydraulic thermostat switch 283 with the spring contacts 267, 221 and through the pivot pin 231 and the strip conductor 328 with the wedge shaped contact 233 also simplifies the connections and reduces the cost. The yoke type cam, rack and pinion inverting and twisting mechanism is also very simple and inexpensive.

Most of the parts can be molded from various plastics. By this arrangement and advantageous construction there is obtained at a relatively low cost, an improved simplified ice maker which ejects the frozen liquid without the use of heat.

While the embodiments of the invention as herein disclosed constitute preferred forms, it is to be understood that other forms might be adopted.

We claim:

1. An automatic liquid freezer including a mold, means for supplying liquid to said mold, means for freezing the liquid in said mold, a drive motor, a commutator driven by said drive motor, a commutator contact means connected in series with said drive motor cooperating with said commutator for controlling the operation of said drive motor, wherein the improvement comprises providing said commutator with means for cooperating with said contact means for stopping said drive motor after the operation of said means for supplying liquid, thermostatic means responsive to the temperature of said mold for restarting said drive motor, said commutator contact means comprising a contact member having one portion adapted to contact said commutator and having a second portion, said second portion being provided with cooperating contacts connecting with said drive motor, means operated by said drive motor for ejecting frozen liquid from said mold, a removable collecting bin for collecting the frozen liquid from said mold, and resilient supporting means for said bin responsive to a predetermined mass of said collecting bin or the absence of said bin for disengaging said cooperating contacts for stopping the operation of said drive motor.

2. An automatic liquid freezer including a mold, means for supplying liquid to said mold, means for freezing the liquid in said mold, a drive motor, a commutator driven by said drive motor, means operated by said drive motor for ejecting frozen liquid from said mold, a movable collecting bin for collecting the frozen liquid ejected from said mold, wherein the improvement comprises, a pivoted contact member having one portion adapted to contact said commutator and having a second portion, said second portion being provided with cooperating contacts connecting with said drive motor, said collecting bin being provided with resilient supporting means comprising a weak spring having spring force less than the weight of said collecting bin and a stronger spring for having a spring force substantially equal to a mass substantially equal to the ice capacity of said bin, and means connecting said resilient supporting means and said pivoted contact member for engaging and disengaging said cooperating contacts for controlling the operation of said drive motor.

3. An automatic liquid freezer including a mold, means for supplying liquid to said mold, means for freezing the liquid in said mold, a drive motor, a commutator driven by said drive motor, means operated by said drive motor for ejecting frozen liquid from said mold, a movable collecting bin for collecting the frozen liquid ejected from said mold, wherein the improvement comprises a pivoted contact member having one portion adapted to contact said commutator and having a second portion, said second portion being provided with cooperating contacts connecting with said drive motor, said collecting bin being provided with resilient supporting means operatively connected to said pivoted contact member for moving said pivoted contact member to engage and disengage said cooperating contacts in accordance with the deflection of said resilient supporting means, one of said contact members being wedge shaped, and means for adjusting the position of said wedge shaped contact member for varying the engaged and disengaged positions of said pivoted contact member.

4. An automatic liquid freezer including a mold, means for supplying liquid to said mold, means for freezing the liquid in said mold, a drive motor, a commutator driven by said drive motor, means operated by said drive motor for ejecting frozen liquid from said mold, a movable collecting bin for collecting the frozen liquid ejected from said mold, wherein the improvement comprises a pivoted contact member having one portion adapted to contact said commutator and having a second portion provided with cooperating contacts connecting with said drive motor, said collecting bin being provided with resilient supporting means operably connected to said pivoted contact member for engaging and disengaging said cooperating contacts, a second commutator contact member connected to said drive motor, and a thermostatic switch means responsive to the temperature of said mold connected between said second commutator contact member and one of said cooperating contacts.

5. An automatic liquid freezer including a mold, means for supplying liquid to said mold, means for freezing the liquid in said mold, a drive motor, a commutator driven by said drive motor, means operated by said drive motor for ejecting frozen liquid from said mold, a movable collecting bin for collecting the frozen liquid ejected from said mold, wherein the improvement comprises a pivoted contact member having one portion adapted to contact said commutator and having a second portion provided with cooperating contacts, said collecting bin being provided with resilient supporting means operably connected to said pivoted contact member for engaging and disengaging said cooperating contacts, a second commutator contact member connected to said drive motor, and a thermostatic switch means responsive to the temperature of said mold having means providing an electrical connection between said second commutator contact member and one of said cooperating contacts.

6. An automatic liquid freezer including a mold, means for supplying liquid to said mold, means for freezing the liquid in said mold, a drive motor, a commutator driven by said drive motor, means operated by said drive motor for ejecting frozen liquid from said mold, a movable collecting bin for collecting the frozen liquid ejected from said mold, wherein the improvement comprises a pivoted contact member having one portion adapted to contact said commutator and having a second portion provided with cooperating contacts, said collecting bin being provided with resilient supporting means operably connected to said pivoted contact member for engaging and disengaging said cooperating contacts, a second commutator contact member connected to said drive motor, a thermostatic switch means responsive to the temperature of said mold having means providing an electrical connection between said second commutator contact member and one of said cooperating contacts, a third commutator contact member, said thermostatic switch being of the double throw type and having means providing electrical connection between said second contact member and said third commutator contact member in one position and having means for providing an electrical connection between said second contact member and one of the cooperating contacts in the alternate position, said commutator being provided with a non-electrical contact zone located to disconnect from said pivoted contact member after the operation of said means for supplying liquid to said mold.

References Cited
UNITED STATES PATENTS 3,308,631  12/1969  Kniffin _____ 62—137

WILLIAM E. WAYNER, Primary Examiner

U.S. Cl. X.R.

62—353

PO-1050
(5/69)

UNITED STATES PATENT OFFICE
CERTIFICATE OF CORRECTION

Patent No. 3,540,227            Dated November 17, 1970

Inventor(s) Charles W. Eyman, Jr. - Floyd O. Moody - Harold M.

It is certified that error appears in the above-identified patent and that said Letters Patent are hereby corrected as shown below:

Column 4, line 54:

After "crank pin", the reference numeral "159"

should read -- 149 --.

Column 7, line 42:

At end of line, "seats the" should read

-- seal the --.

Signed and sealed this 20th day of April 1971.

(SEAL)
Attest:

EDWARD M. FLETCHER, JR.           WILLIAM E. SCHUYLER, JR
Attesting Officer                  Commissioner of Patents